(12) United States Patent
Jibry

(10) Patent No.: US 7,126,771 B2
(45) Date of Patent: Oct. 24, 2006

(54) DATA READ CHANNEL AND METHOD OF CONTROLLING THE SAME

(75) Inventor: Rafel Jibry, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 384 days.

(21) Appl. No.: 10/189,174

(22) Filed: Jul. 5, 2002

(65) Prior Publication Data

US 2003/0007272 A1    Jan. 9, 2003

(30) Foreign Application Priority Data

Jul. 7, 2001    (GB) ................................ 0116659.4

(51) Int. Cl.
*G11B 5/09* (2006.01)

(52) U.S. Cl. ........................................................ 360/46
(58) Field of Classification Search .................. 360/46, 360/48, 39
See application file for complete search history.

(56) References Cited

U.S. PATENT DOCUMENTS

| | | | | |
|---|---|---|---|---|
| 5,463,603 A | * | 10/1995 | Petersen | ...................... 360/67 |
| 5,483,393 A | * | 1/1996 | Mento et al. | ............ 360/77.08 |
| 5,757,854 A | * | 5/1998 | Hunsinger et al. | .......... 375/260 |
| 5,771,131 A | * | 6/1998 | Pirzadeh | ....................... 360/75 |
| 5,864,442 A | | 1/1999 | Naito | |
| 6,353,315 B1 | * | 3/2002 | Egan et al. | .................... 360/31 |
| 6,476,743 B1 | * | 11/2002 | Brown et al. | .................. 360/43 |
| 6,570,722 B1 | * | 5/2003 | Yokozawa et al. | ............ 360/53 |

FOREIGN PATENT DOCUMENTS

EP    0 361 804 B1    4/1990

* cited by examiner

*Primary Examiner*—Wayne Young
*Assistant Examiner*—Glenda P. Rodriguez

(57) ABSTRACT

A data read channel for receiving a signal containing a data stream of different types of data and recovering data therefrom, the channel comprising a main data read channel operable to output a stream of recovered data and a branch from the main data read channel comprising a signal analyser to determine the type of data from the data stream of different data types flowing in the main data read channel and a controller operable to control at least one element of the main data read channel in response to the type of data identified by the signal analyser from the data stream.

29 Claims, 3 Drawing Sheets

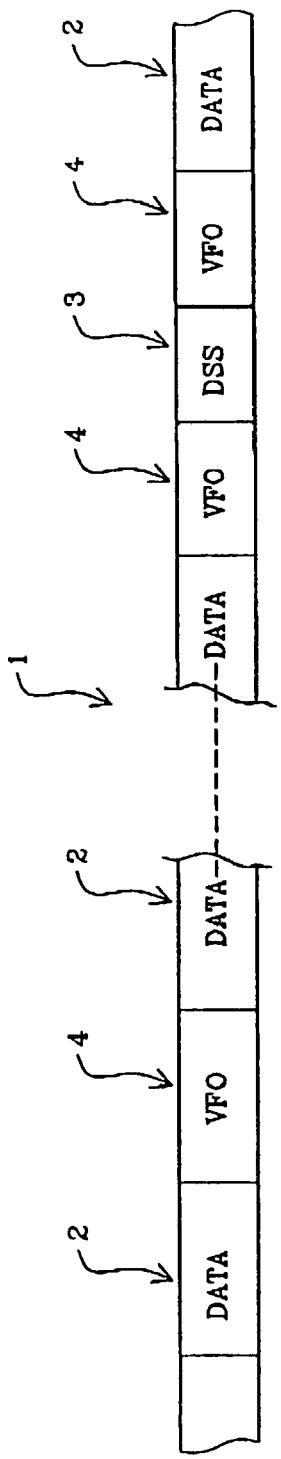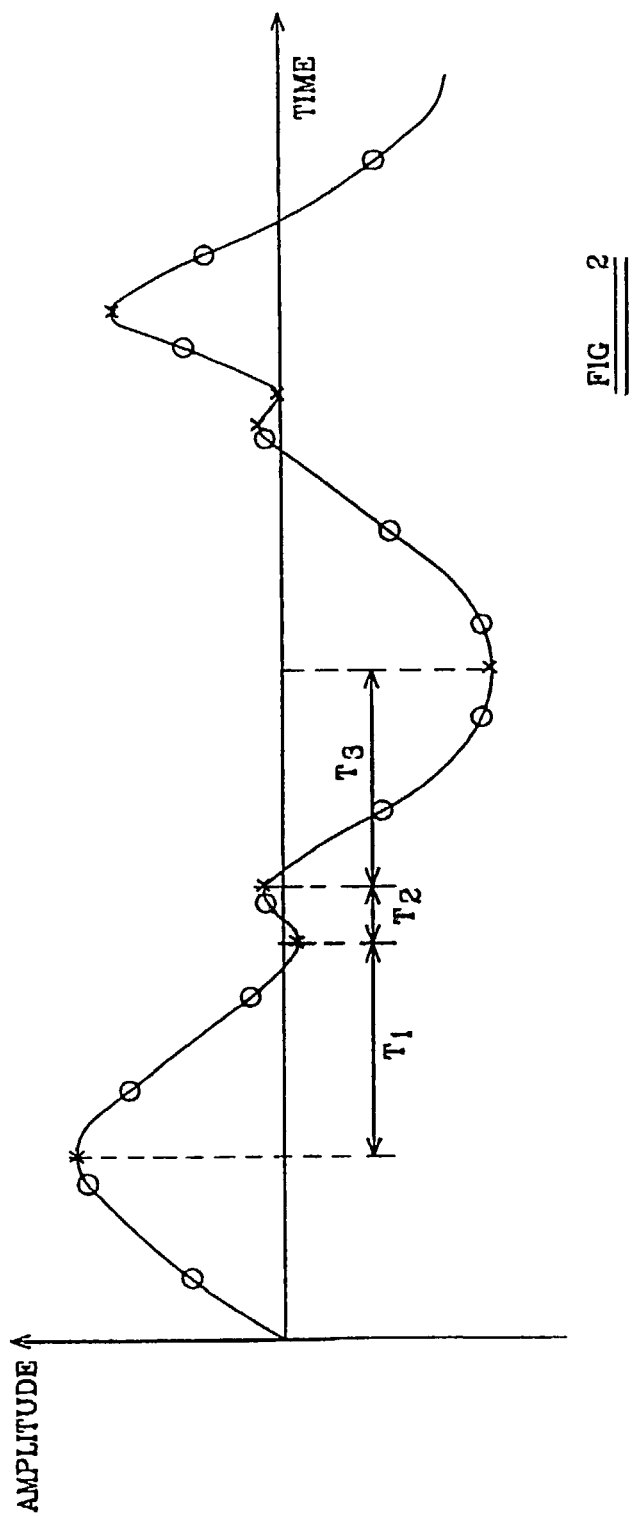

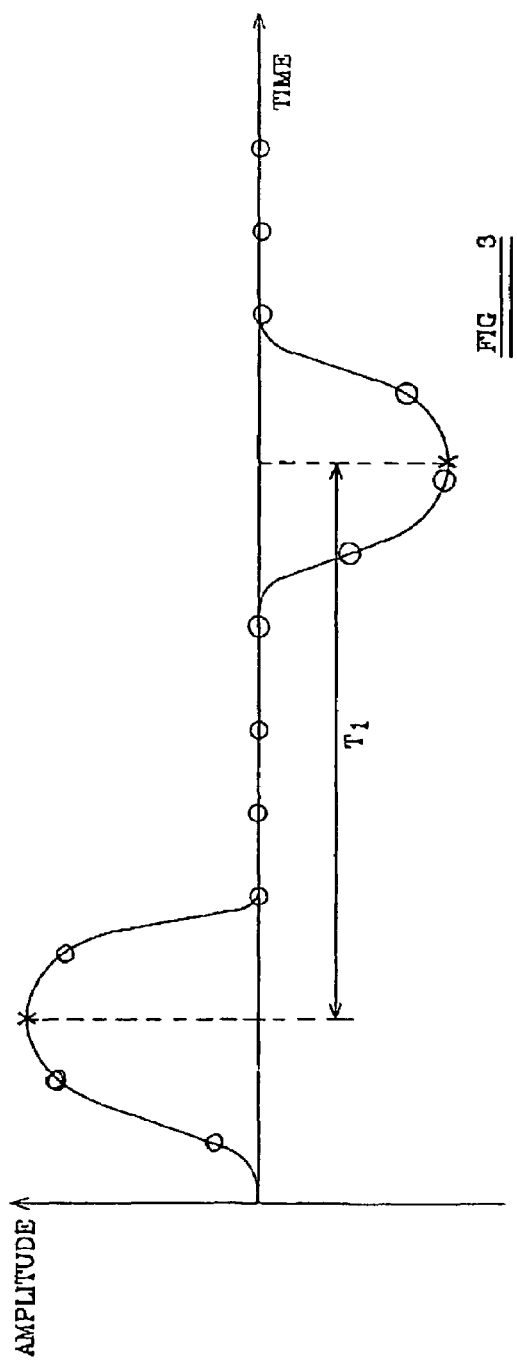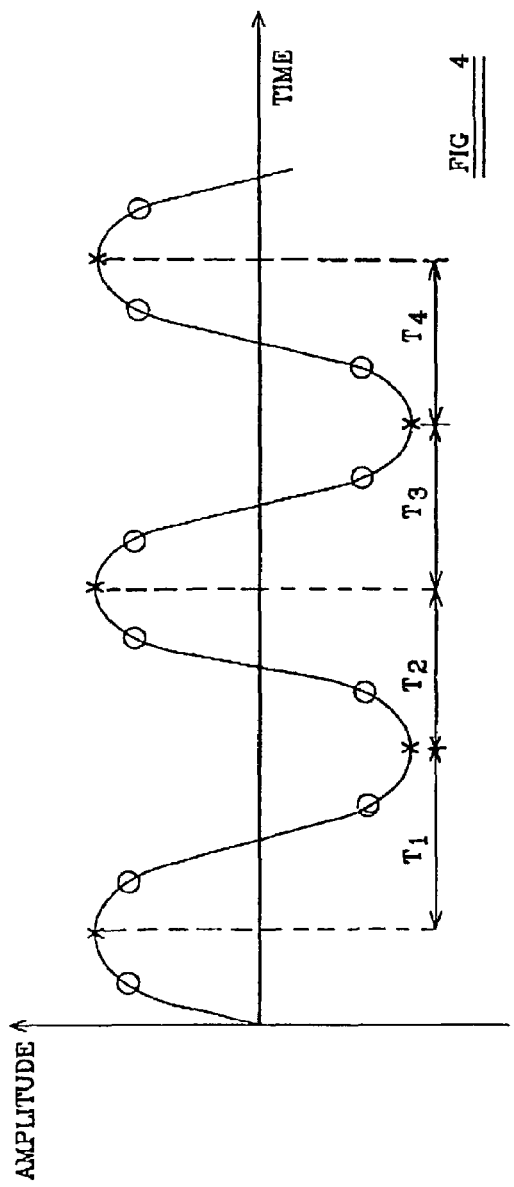

DATA READ CHANNEL AND METHOD OF CONTROLLING THE SAME

RELATED APPLICATIONS

The present application is based on, and claims priority to British Application Serial Number 0116659.4, filed Jul. 7, 2001, the disclosure of which is hereby incorporated by reference herein in its entirety.

THIS INVENTION RELATES to a data read channel and a method of controlling a data read channel carrying a signal from which data is to be recovered. The invention extends in general to apparatus and methods for processing data in communication channels.

In a magnetic tape drive, a signal is recovered from the tape by a magnetic transducer read head connected to a data read channel. The signal is fed to the data read channel which adaptively filters and processes the signal to recover data from the signal. The data read channel is made up of a number of controllable elements, typically comprising an automatic gain control circuit, one or more adaptive filters, a timing recovery circuit and a data detector such as a Viterbi decoder. Each of the controllable elements has various modes or settings which can be optimised to maximise the chances of recovering data correctly from the signal. It is important that the channel locks onto the data very quickly in order to maximise the chance of correctly recovering data. The problem with attempting to lock onto the data very rapidly is that a rapid lock requires very fast control loops in the channel which then becomes susceptible to unstable behaviour. The result can therefore be either an incorrect lock or no lock at all.

Some data patterns are more suitable than others for locking on to. Additionally, it should be noted that the various elements making up a data read channel have different sensitivities to different data types and patterns. For example, a 2T tone (11001100) is good for allowing the timing recovery circuit to lock onto but is bad for obtaining a lock using an adaptive filter.

It is an object of the present invention to seek to provide a data read channel and method of controlling a data read channel which does not suffer from the above mentioned problems and which is able to lock onto data quickly without having to resort to fast control loops which can cause unstable behaviour.

EP-A-0 361 804 discloses a video tape recording and/or reproducing apparatus which incorporates a signal detecting circuit which is operable to detect the modulation of signals which are recorded on a magnetic tape and, in response to that determination, to re-route or switch to an appropriate de-modulation circuit for connection to the signal output line. The magnetic tape will contain video, PCM and FM signal formats each having its own data stream. Thus, the data in each of the data streams is of the same type, being either video, PCM or FM signals.

U.S. Pat. No. 5,864,442 discloses a digital data reproducer which reproduces digital data from a plurality of types of recording media and which has a controller which controls the equalisation characteristics of an equaliser in accordance with the type of recording media being used.

In neither of these two cases does the signal which is being reproduced contain a data stream of sequential different types of data. Hence, there is no dynamic control of the element making up the data read channel in response to the type of data flowing in the data read channel at any given time.

Accordingly, one aspect of the present invention provides a data read channel for receiving a signal comprising a data stream of sequential different types of data and recovering data therefrom the channel comprising a main data read channel operable to output a stream of recovered data and a branch from the main data read channel comprising a signal analyser to determine the type of data from the data stream of sequential different data types flowing in the main data read channel and a controller operable to control at least one element of the main data read channel in response to the type of data identified by the signal analyser from the data stream.

Advantageously, the signal analyser comprises a digital peak detect operable to sample the signal from the main data read channel and reconstruct therefrom the maxima and minima of the signal to determine at least the timings between maxima and minima.

Preferably, the digital peak detect is further operable to reconstruct the amplitudes of the maxima and minima of the signal from the main data read channel.

Conveniently, the digital peak detect identifies the type of data in the main data read channel, based on the timings between maxima and minima.

Advantageously, the elements of the main data read channel comprise at least: a pre-amplifier; an analogue to digital converter; a timing recovery circuit; and a data detector.

Preferably, the branch from the main data read channel taps the signal after the pre-amplifier and before the other elements of the main data read channel.

Conveniently, the branch from the main data read channel taps the signal before the analogue to digital converter, the branch further comprising an analogue to digital converter to feed the signal analyser.

Advantageously, the data read channel further comprises an automatic gain control circuit including automatic gain control and a variable gain amplifier; an adaptive filter and the branch from the main data read channel taps the signal after the automatic gain control circuit and before the adaptive filter and timing recovery circuit.

Preferably, the at least one controllable element of the main data read channel is selected from the group consisting of: an automatic gain control circuit; an adaptive filter; and a timing recovery circuit.

Another aspect of the present invention provides a method of controlling a data read channel having at least one controllable element, the method comprising the steps of: providing on a data read channel a signal comprising a data stream of sequential different types of data from which data is to be recovered; tapping the signal flowing in the data read channel from the data read channel; determining the type of data present in the tapped signal; and controlling at least one of the controllable elements of the data read channel in response to the type of data determined to be present in the data stream of the tapped signal.

Conveniently, the step of determining the type of data present in the tapped signal comprises the steps of: sampling the tapped signal; reconstructing from the sampled signal the maxima and minima of the tapped signal to determine at least the timings between maxima and minima.

Preferably, the at least one controllable element of the data read channel has a plurality of modes of operation which are selected in response to the type of data determined to be present in the tapped signal to maximise the chances of correct data recovery.

In order that the present invention may be more readily understood, embodiments thereof will now be described, by way of example, with reference to the accompanying drawings in which:

FIG. 1 is a schematic representation of a sample of data recorded on a magnetic tape;

FIG. 2 is a schematic representation of a signal trace representative of random data recovered from a magnetic recording medium;

FIG. 3 is a schematic representation of a signal trace of a data set separator field tone field recovered from a magnetic recording medium;

FIG. 4 is a schematic representation of a signal trace of a VFO ["Variable Frequency Oscillator"] tone field recovered from a magnetic recording medium.

Figure 5:
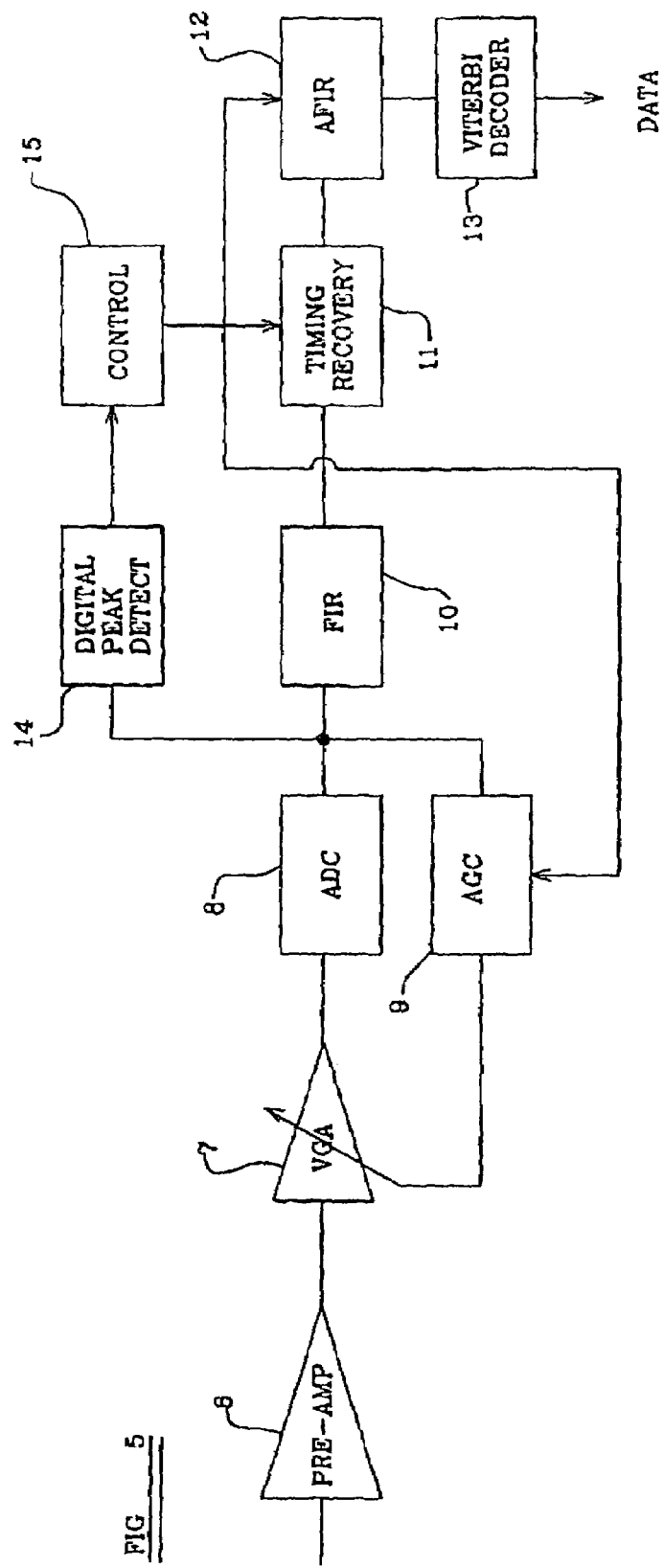
FIG. 5 is a schematic block diagram of a data read channel embodying the present invention.

Referring to FIG. 1, data is recorded onto a magnetic recording medium, in the present example, a magnetic tape 1, in a series of blocks. The example shown in FIG. 1 uses the LTO format. The tape 1 carries a data stream of sequential different types of data. In this example, the tape carries blocks of random data 2 which are intermittently separated into data sets by blocks of data set separators 3. The random data blocks 2 between data set separators 3 are further sub-divided by blocks of VFO tone fields 4.

FIGS. 2, 3 and 4 show examples of the signals recovered by the data read channel from, respectively, random data blocks 2, data set separators 3 and VFO tone fields 4. It will be appreciated that the random data signal has, by its nature, a random structure which is spectrally rich (one basic data type) whereas the VFO tone fields and the data set separators are very regular and repetitive signals (another basic data type).

Referring now to FIG. 5, a data read channel 5 embodying the present invention comprises a pre-amplifier 6 fed with an analogue signal from a magnetic transducer data read head (not shown); an automatic gain control circuit comprising a variable gain amplifier 7, an analogue to digital converter 8, and a feedback loop incorporating automatic gain control 9; a filter 10; a timing recovery circuit 11; an adaptive filter 12 and a Viterbi decoder 13. These elements of the data read channel comprise the main data read channel and are conventional in both structure and function. However, a branch is provided from the main data read channel which comprises a signal analyser 14 and a controller 15. The signal analyser 14 comprises a digital peak detect which samples the signal from the main data read channel and reconstructs the timings and amplitudes of the peaks and troughs of the digitised samples. In FIGS. 2, 3 and 4, the samples are identified by circles and the peaks and troughs reconstructed by the digital peak detect are identified by crosses.

The type of data flowing at any given time in the main data read channel can be determined from the output of the signal analyser. For example, the timings between peaks and troughs in a VFO tone signal are uniform whereas the timings between peaks and troughs in the random data are varied, if not random. The VFO tone field signal can be distinguished from the data set separator signal by the length of time between peaks and troughs, the data set separator signal having a much lower frequency. In the LTO format, the VFO tone field is a 2T signal whereas the data set separator signal is usually a 9T signal. The relative timings between maxima and minima therefore provide a good indicator of the type of data flowing at any given time in the main data read channel. Other alternative or additional indicators which may be utilised to identify a type of data flowing in the main data read channel comprise: the use of frequency spectral analysis of the signal by performing, for example, fast Fourier transform of the signal. Such spectral analysis shows the tone fields as clear spikes in the frequency domain whereas data fields are shown as a broad band signal across the frequency domain (being spectrally rich).

Thus, the signal analyser 14 can distinguish between the different types of data in a data stream and make a determination as to the type of data flowing in the main data read channel. This is extremely valuable information as it enables the subsequent elements of the main data read channel to be controlled so that their settings are optimised to the particular type of data flowing in the main data read channel at that time so that the chances of correctly recovering data from the channel are maximised. In this regard, the output from the signal analyser 14 is fed to the controller 15 which is operable to control one or more of the controllable elements of the main data read channel. In the example shown in FIG. 5, the controller 15 is operable to alter the settings or mode of the automatic gain control circuit, the timing recovery circuit 11 and the adaptive filter 12. In dependence on the type of data recognised by the signal analyser 14 to be flowing in the main data read channel, the controller is operable to switch the modes or settings of the automatic gain control circuits, the timing recovery circuits and the adaptive filters to selected ones of an acquisition mode, a tracking mode or a freeze mode in which the settings are frozen and adaption halted. The settings of the main data read channel are therefore tailored to the type of data determined to be flowing through the main data read channel. Since the main data read channel effectively now knows its position in the data stream, this allows the channel to lock more effectively, for example, by switching to an acquisition mode when in the VFO tone field (one data type) or by switching to a normal tracking mode when in random data (another data type). When in the data set separator blocks, the system can be used to estimate the frequency and gain of the signal for further real time updates on tape speed, for example.

It should be noted that the main data read channel is typically a highly complex structure and incorporates a great deal of latency. For this reason, the point at which the branch containing the signal analyser 14 and the controller 15 is located should be as early as possible along the main data read channel, preferably in the location shown in FIG. 5, after the automatic gain control circuit and before the more complex downstream elements. Taking the pick off for the branch immediately after the automatic gain control circuit and the analogue to digital converter 8 provides the signal analyser with a digitised analogue waveform which is perfect for handling by the signal analyser 14 when embodied as a digital peak detect. Additionally, taking the pick off at this point makes the signal analyser less complex and/or provides a greater level of certainty for the results calculated by the signal analyser 14.

Effectively, the branch from the main data read channel comprises a low resolution read channel offering very quick analysis of the signal flowing through the main data read channel and allowing the performance of the elements in the main data read channel to be optimised under the control of that branch whilst that same type of data flows through the main data read channel. It would be possible to connect the branch earlier in the main data read channel, before the analogue to digital converter, but that would necessitate use of an analogue peak detect which are difficult to manufacture in large volumes. However, the benefits of such an early pick off could in certain applications outweigh this difficulty, the early pick off providing excellent anticipation and control of the elements in the main data read channel.

The branch could also be tapped off later along the main data read channel, for example after the filter 10, after the timing recovery circuit 11 or after the adaptive filter 12. Although such pick offs provide much better quality information, the latency inherent in the channel at these late pick off points makes the information less useful since the data has already emerged from the data read channel and cannot be changed or altered by any of the controllable elements of the main data read channel.

The PRML section of the main data channel (the timing recovery circuit 11, the adaptive filter 12 and the Viterbi decoder 13) are less likely to lock onto data when attempting the rapid lock because of gain, phase and frequency errors which are so readily introduced at this stage because of the sensitivity of the PRML section of the channel thereto. The digital peak detect is far less sensitive to gain, phase and frequency errors and therefore offers a more robust solution. Indeed, to attempt to improve the performance of the data read channel to make the PRML section of the channel as robust as the channel embodying the present invention would mean making the timing recovery circuits far more complex and costly to compensate for the gains, phase and frequency errors.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilised for realising the invention in diverse forms thereof.

The invention claimed is:

1. A read channel for (a) receiving a signal including a stream of sequential data of a first data type and a second data type, the first data type having a random signal structure and the second data type having a regular signal structure, and (b) recovering the random data type and the regular signal structure, in combination with a magnetic tape head for deriving the signal, the channel comprising (a) a main data read channel operable to output the sequential first and second data types, and (b) a branch from the main data read channel, the branch comprising a signal analyzer for determining whether the signal in the channel at a particular time is the first data type or the second data type, and a controller operable to control at least one element of the main data read channel in response to determination by the signal analyzer from the data stream so that the determination made for the first data type controls the element at the time while the first data type is in the main data channel; and the magnetic head being arranged to interact with magnetic tape that is arranged to move relative to the head for causing the signal derived by the head to have interspersed (a) non-periodic, variable amplitude maxima and minima, (b) periodic data separator variations having a first fixed frequency, and (c) periodic tone fields having a second fixed frequency.

2. A channel according to claim 1, wherein the signal analyzer comprises a digital peak detector operable to sample the signal from the main data read channel and reconstruct therefrom maxima and minima of the signal to determine at least the timings between maxima and minima.

3. A channel according to claim 2, wherein the digital peak detector is further operable to reconstruct the amplitudes of the maxima and minima of the signal from the main data read channel.

4. A channel according to claim 2, wherein the digital peak detector is arranged to identify whether the signal in the main data read channel represents the random data type or the regular signal structure, based on the timings between maxima and minima.

5. A channel according to claim 1, wherein the elements of the main data read channel comprise at least:
a pre-amplifier;
an analogue-to-digital converter;
a timing recovery circuit; and
a data detector.

6. A channel according to claim 5, wherein the branch from the main data read channel is arranged to tap the signal after the pre-amplifier and before other elements of the main data read channel.

7. A channel according to claim 5, wherein the branch from the main data read channel further comprises an analogue-to-digital converter for feeding the signal analyzer and arranged to tap the signal before the analogue-to-digital converter.

8. A channel according to claim 5, wherein the data read channel further comprises an automatic gain control circuit including automatic gain control and a variable gain amplifier, an adaptive filter and the branch from the main data read channel being arranged to tap the signal after the automatic gain control circuit and before the adaptive filter and timing recovery circuit.

9. A channel according to claim 1, wherein the at least one controllable element of the main data read channel is selected from the group comprising:
an automatic gain control circuit;
an adaptive filter; and
a timing recovery circuit.

10. A channel according to claim 1, wherein the signal is an analog signal, the main channel includes an analog-to-digital converter connected to be responsive to the analog signal, and the analyzer includes a digital peak detector connected to be responsive to a digital signal derived by the converter.

11. A channel according to claim 10, wherein the digital peak detector is arranged to reconstruct peak values of the analog signal and to determine whether the signal is the first data type or the second data type in response to the time difference between the reconstructed peak values.

12. A channel of claim 11, wherein the reconstructed peak values have positive and negative values, and the digital peak detector is arranged to make the determination in response to adjacent positive and negative reconstructed peak values.

13. A channel according to claim 12, wherein the main channel includes (a) a digital filter arrangement connected to be responsive to the digital signal derived by the detector and (b) a timing recovery circuit connected to selectively pass to an output a digital output signal of the digital filter in response to the digital peak detector determining from the reconstructed peak values that the data type of the analog signal is the random data, in contrast to the analog signal having waveforms having predetermined, periodic characteristics.

14. A method of controlling a data read channel including a stream of sequential data of a first type and a second data type, the first data type having a random signal structure and the second data type having a regular signal structure, the channel having at least one controllable element, the method comprising:
deriving the signal by detecting magnetic variations on a tape moving relative to a magnetic head, the magnetic variations causing the random data of the signal to have interspersed (a) non-periodic, variable amplitude maxima and minima, (b) periodic data separator variations having a first fixed frequency, and (c) periodic tone fields having a second fixed frequency;

determining, from the signal, whether the first data type or the second data type is present in one of the controllable elements; and controlling the one controllable element in response to the determination so that the controllable element controls the first data type in a manner different from the second data type.

15. A method according to claim 14, wherein the step of determining comprises the steps of:

sampling the signal in the data read channel; and determining the timings between maxima and minima of the sampled signal by reconstructing from the sampled signal the maxima and minima of the signal.

16. A method according to claim 15, wherein the frequency of the samples is such that the samples do not necessarily occur at the same times as the maxima and minima, and reconstructing the maxima and minima from the samples.

17. A data read channel for receiving a signal including a stream of sequential data of a first type and a second data type, the first data type having a random signal structure and the second data type having a regular signal structure and recovering data therefrom, in combination with a magnetic tape head for deriving the signal comprising a main data read channel operable to output a sequential stream of the first data type and the second data type; a branch from the main data read channel, the branch comprising a digital peak detector operable to sample the signal from the main data read channel and reconstruct therefrom maxima and minima of the signal to determine the timings between maxima and minima of the signal to determine whether the first data type or the second data type is in the main data read channel; and a controller operable to control at least one element of the main data read channel in response to the determination by the digital peak detector so that the determination made for the first data type controls the element at the time while the first data type is in the main data channel; and the magnetic head being arranged to interact with magnetic tape that is arranged to move relative to the head for causing the signal derived by the head to have interspersed (a) non-periodic, variable amplitude maxima and minima, (b) periodic data separator variations having a first fixed frequency, and (c) periodic tone fields having a second fixed frequency.

18. A data read channel for receiving a signal including a stream of sequential data of a first type and a second data type, the first data type having a random signal structure and the second data type having a regular signal structure and for recovering the first data type, and the second data type from the signal, in combination with a magnetic tape head for deriving the signal, the channel comprising a main data read channel operable to output a sequential stream of the first data type and the second data type; a branch from the main data read channel comprising a signal analyzer for determining whether the signal in the channel at a particular time is the first data type or the second data type; and a controller connected to be responsive to the determination made by the signal analyzer for controlling at least one controllable element of the main data read channel so that the determination made for the first data type controls the element at the time while the first data type is in the main data channel, the controller being selected from the group consisting of an automatic gain control circuit, an adaptive filter, and a timing recovery circuit; and the magnetic head being arranged to interact with magnetic tape that is arranged to move relative to the head for causing the signal derived by the head to have interspersed (a) non-periodic, variable amplitude maxima and minima, (b) periodic data separator variations having a first fixed frequency, and (c) periodic tone fields having a second fixed frequency.

19. Apparatus for receiving an analog signal including random data representing waveforms interspersed with waveforms having predetermined, non-random characteristics, in combination with a magnetic tape head for deriving the signal, the apparatus comprising an analog-to-digital converter connected to be responsive to the analog signal for deriving a digital signal, a digital peak detector connected to be responsive to the digital signal derived by the converter for reconstructing peak values of the analog signal and for deriving, in response to the reconstructed peak values, indications that the random data are in the analog signal being processed by the apparatus, and a switching arrangement connected to be responsive to the indications for passing the digital signal derived by the converter and corresponding with the random data of the analog signal to an output and for blocking the passage to the output of the digital signal corresponding with the waveform of the analog signal having the predetermined, non-random characteristic; and the magnetic head being arranged to interact with magnetic tape that is arranged to move relative to the head for causing the signal derived by the head to have interspersed (a) non-periodic, variable amplitude maxima and minima, (b) periodic data separator variations having a first fixed frequency, and (c) periodic tone fields having a second fixed frequency.

20. An apparatus according to claim 19, wherein the reconstructed peak values have positive and negative values, and the digital peak detector is arranged to determine the type of data in response to adjacent positive and negative reconstructed peak values.

21. An apparatus according to claim 20, further including a digital filter arrangement connected to be responsive to the digital signal derived by the converter, the switching arrangement being connected to be responsive to a digital signal derived by the filter arrangement.

22. An apparatus according to claim 19, wherein one of the waveforms having the non-random characteristics is a tone and a second of the waveforms having a non-random characteristic is a data set separator.

23. An apparatus according to claim 19, wherein the digital peak detector is arranged to derive the indication in response to time differences between the reconstructed peak values.

24. An apparatus according to claim 19, wherein the digital to analog converter is arranged to derive the digital signal in response to periodic samples of the analog signal and the digital peak detector is arranged to derive the reconstructed peak values in response to the periodic samples.

25. A method of processing an analog signal including random data representing waveforms interspersed with at least one waveform having predetermined, non-random characteristics, the method comprising:

deriving the signal by detecting magnetic variations on a tape moving relative to a magnetic head, the magnetic variations causing the random data of the signal to have interspersed (a) non-periodic, variable amplitude maxima and minima, (b) periodic data separator variations having a first fixed frequency, and (c) periodic tone fields having a second fixed frequency;

converting the analog signal into a digital signal;

reconstructing peak values of the analog signal by responding to the digital signal;

deriving, in response to the reconstructed peak value, an indication that the random data are in the analog signal being processed;

responding to the indication by passing the digital signal corresponding with the random data of the analog signal to an output; and blocking passage to the output of the digital signal corresponding with the waveform of the analog signal having the predetermined, non-random characteristic.

26. A method according to claim 25, further including digitally filtering the digital signal before the digital signal is passed or blocked.

27. A method according to claim 25, wherein one of the waveforms having the non-random characteristics is a tone and a second of the waveforms having a non-random characteristic is a data set separator.

28. A method according to claim 25, wherein the indication is derived in response to time differences between the reconstructed peak values.

29. A method according to claim 25, wherein periodic samples of the analog signal are converted into the digital signal and the reconstructed peak values are derived in response to the periodic samples.

* * * * *